United States Patent Office 3,658,959
Patented Apr. 25, 1972

3,658,959
NOVEL CARBAMATE INSECTICIDAL COMPOSITIONS
Clyde G. Inks, Taylor, Mich. (% Wyandotte Chemicals Corp., Wyandotte, Mich 48192)
No Drawing. Filed Sept. 16, 1966, Ser. No. 579,849
Int. Cl. A01n 9/20
U.S. Cl. 424—300
7 Claims

ABSTRACT OF THE DISCLOSURE

Polybasic acid esters of hydroxyl-terminated oxyalkylene polyols provide stability to carbamate insecticidal compositions and compatibility when these compositions are employed along with other active ingredients in the preparation of pesticidal formulations.

---

The present invention relates to highly stable carbamate insecticidal compositions and to pesticidal formulations prepared therefrom. More particularly, the invention relates to certain esters which provide stability to carbamate insecticidal compositions and compatibility when these compositions are employed, along with other active ingredients, in the preparation of pesticidal formulations.

In order that all pests may be treated in a single application, it is often desirable to combine two or more pesticides prior to their application onto an infected area. When a carbamate is employed as one of the pesticides, much difficulty has heretofore been encountered. It appears that carbamates, as a class, are generally incompatible with other pesticides. This incompatibility causes coagulation of pesticidal formulations prepared from carbamates and renders them useless in most commercial applications. This is particularly so in spray applications since coagulation causes blockage of the filter screen in the spray nozzle.

Several compounds have been added to carbamates in an attempt to provide compatibility between the carbamates and other pesticides. Very few compounds have proven successful as compatibility agents for carbamates and those that have often affect the stability of the carbamate compositions since these agents generally decompose at temperatures which are encountered in storage as do the carbamates. Thus, if a compound is to be an effective additive for carbamate compositions, it must not only provide for compatibility between carbamates and other pesticides but also it must be stable itself and it must prevent decomposition of the carbamates during storage and at elevated temperatures.

It is an object of the present invention to provide for novel, stable carbamate insecticidal compositions. A further object of the invention is to provide for novel pesticidal compositions containing a carbamate insecticide as an active ingredient. Still another object of the invention is to provide for compatibility agents for carbamate insecticides. The above and additional objects will become apparent from the following specification and claims.

In accordance with the present invention, it has been determined that a certain group of esters are exceptional compatibility agents for carbamate insecticides and that insecticidal compositions prepared therewith exhibit marked improvements in storage stability. The esters which may be employed in accordance with the invention are prepared by the reaction of a polybasic acid with certain hydroxyl-terminated oxyalkylene polyols as described in U.S. Pat. Nos. 3,110,682 and 3,168,478.

Any polybasic acid may be used in the preparation of the esters employed in accordance with the present invention. Illustrative acids include inorganic acids such as phosphoric acid, phosphorous acid and boric acid; aliphatic organic acids such as malonic acid, succinic acid, glutaric acid, adipic acid, maleic acid, fumaric acid, malic acid, oxalic acid, tartaric acid, and diglycollic acid; and aromatic organic acids such as phthalic acid, terephthalic acid, isophthalic acid, uvitic acid, trimellitic acid, and mixtures thereof. Preferred acids include phosphoric acid and diglycollic acid. Esters prepared from monobasic acids such as acetic acid and benzoic acid are not useful in the present invention.

The hydroxyl-terminated oxyalkylene polyols which may be esterified and employed in the present invention are compounds of the formula:

wherein $b$ is an integer sufficient to provide an average molecular weight of at least 1200, and
$a+c$ is an integer sufficient to provide 10 to 90 weight percent of the total molecular weight of the compound.

The compounds of the above formula are prepared by the sequential addition of propylene oxide and ethylene oxide to propylene glycol. A more detailed description of these products and their preparation may be found in U.S. Pat. No. 2,674,619. Mixtures of any of the above polyols may also be used. Preferred polyols are those when $b$ is an integer sufficient to provide an average molecular weight of about 2300 and $a+c$ is an integer sufficient to provide 50 to 70 weight percent of the total molecular weight of the polyol. In lieu of or in addition to the polyols of the above formula, it is possible to employ certain heteric-type polyols prepared by the addition of alkylene oxide mixtures to various glycols.

In the preparation of the esters which are employed in accordance with the present invention, it is preferred to employ amounts of acids in excess of that required for complete esterification of the polyols. Thus, for example, one mole of a polyol prepared by reacting ethylene oxide with a 2300 molecular weight condensation product of propylene glycol and propylene oxide, the ethylene oxide content of the total polyol being 50%, is generally esterified with at least one mole, but preferably two moles, of a dibasic acid such as adipic acid. It is to be understood that the esterification product is often a mixture of completely esterified polyol, of partially esterified polyol, and of polymerized esterified polyol.

As mentioned before, the esters described above are employed as compatibility agents for carbamate insecticides. Carbamates which may be employed in accordance with the present invention include the N-alkyl carbamates such as 1-naphthyl-N-methylcarbamate, o-isopropoxy-phenyl-N-methylcarbamate, 4-dimethylamino-m-tolyl-N- methylcarbamate, any of the many substituted-phenyl-N-methylcarbamates, and any of the alkyl- or aryl-N-phenylcarbamates.

Prior to use, the above-mentioned carbamates containing a compatibility agent of the present invention are combined with another pesticide into the pesticidal formulations which comprise a preferred embodiment of the present invention. Thus insecticides, miticides, fungicides and/or herbicides which heretofore were incompatible with carbamates may now be formulated along with the above-mentioned carbamates. Representative pesticides include sulfur, 1,1,1 - trichloro-2,2-bis(p-chlorophenyl)-ethane (DDT), 1,1,1-trichloro-2,2-bis(p-methoxyphenyl)-ethane (methoxychlor), paradichlorobenzene, hexachlorobenzene, zinc dimethyldithiocarbamate, 1,2,3,4,10,10-hexachloro-6,7-epoxy-1,4,4α,5,6,7,8,8α - octahydro - 1,4-endo-exo-5,8-dimethanonaphthalene (dieldrin), 1,2,3,4,-10,10 - hexachloro-6,7-epoxy-1,4,4α,5,6,7,8,8α-octahydro-1,4 - endo-endo - 5,6 - dimethanonaphthalene (endrin), 1,2,3,4,10,10 - hexachloro - 1,4,4α,5,8,8α - hexahydro-1,4-endo-exo-5,8-dimethanonaphthalene (aldrin), 2,4-dichlorophenoxyacetic acid and salts thereof, 2,4,5-trichlorophenoxyacetic acid and salts thereof, O,O-diethyl-O-p-nitrophenylphosphorothioate (parathion), O,O-dimethyl-S - (1,2-dicarbithoxyethyl)phosphorodithioate (malathion), O,O - dimethyl - O-p-nitrophenylphosphorothioate (methyl parathion), a chlorinated camphene with approximate formula: $C_{10}H_{10}Cl_8$, containing about 67 to 69 weight percent chlorine (toxaphene), and 2,4,5,4'-tetrachlorodiphenylsulfone (tedion).

In concentrated form, the carbamate insecticidal compositions of the present invention generally comprise from about 1% to 10% by weight, based on the weight of the carbamate insecticide, of the esterified reaction product of a polybasic acid and an oxyalkylene polyol. In actual use, the concentrated carbamate compositions are generally diluted with water to form a solution or dispersion and mixed with another pesticide. The resulting mixture is then sprayed onto the object to be treated. Alternatively, the concentrated carbamate concentration may be mixed with a pesticide and this mixture may be sprayed or poured onto an infected area. The pesticidal formulations of the present invention will generally comprise, based on 100 parts by weight, from 5 to 70 parts of carbamate, from 0.1 to 10 parts of the esterified reaction product of a polybasic acid and an oxyalkylene polyol, from 5 to 60 parts of a second active ingredient generally incompatible with said carbamate and from 0 to 75 parts of inerts, including water and dispersing and wetting agents.

The following examples serve to illustrate the invention. All parts are by weight unless otherwise stated.

EXAMPLES 1–12

A number of carbamate insecticidal compositions were prepared employing 1-naphthyl-N-methylcarbamate as the active ingredient and certain compounds as candidate compatibility agents therefor. The compositions are presented in Table I, along with stability characterizations thereof. The stability of the compositions was tested by placing samples of the compositions in an oven and periodically checking for discoloration and/or agglomeration.

The carbamate compositions were then formulated into pesticidal compositions by adding the composition to 100 millimeters of water of 100 or 300 p.p.m. hardness and mixing therewith a pesticide generally incompatible with the carbamate. The resulting aqueous solution or dispersion was mixed thoroughly and allowed to stand overnight. The compatibility of the pesticidal formulations was tested 24 hours atfer its preparation in the following manner. The formulations were mixed and poured through a 100 mesh stainless steel screen which is inclined about 25 degrees. If the solution passes through the screen, the formulation is considered compatible. If it does not, water is run on the screen to aid in the passing. If it passes with the aid of water, the formulation is considered marginally compatible. If it fails to pass even with water aid, it is considered incompatible. The same test is conducted after the formulation is allowed to stand for two weeks. The specific formulations and compatibility characterizations thereof are presented in Table I.

TABLE I

| | Carbamate insecticidal composition containing 1-naphthyl-N-methylcarbamate | | | | | Pesticidal formulations | | | |
|---|---|---|---|---|---|---|---|---|---|
| Examples | Parts of carbamate | Compatibility agent | Parts | Stability at— | | Other pesticides | Parts | Compatibility after— | |
| | | | | 50° C. | 60° C. | | | 24 hrs. | 2 wks. |
| 1 | 8.0 | | | 1 week | 2 days | A | 2.4 | Coagulates | Coagulates. |
| 2 | 7.76 | 1 | 0.25 | 2 weeks | 1 week | A | 2.4 | Passes w/pressure | Do. |
| 3 | 7.75 | 2 | 0.25 | >4 months | >4 weeks | A | 2.4 | Passes | Passes. |
| 4 | 7.7 | 3 | 0.3 | >4 months | >4 weeks | A | 2.4 | do | Do. |
| 5 | 8.0 | | | 1 week | 2 days | B | 7.2 | Coagulates | Coagulates. |
| 6 | 7.75 | 1 | 0.25 | 2 weeks | 1 week | B | 7.2 | Passes | Do. |
| 7 | 7.75 | 2 | 0.25 | >4 months | >4 weeks | B | 7.2 | do | Passes. |
| 8 | 7.7 | 3 | 0.3 | >4 months | >4 weeks | B | 7.2 | do | Do. |
| 9 | 8.0 | | | 1 week | 2 days | C | 5.4 | Coagulates | Coagulates. |
| 10 | 7.75 | 1 | 0.25 | 2 weeks | 1 week | C | 5.4 | Passes | Do. |
| 11 | 7.75 | 2 | 0.25 | >4 months | >4 weeks | C | 5.4 | do | Passes. |
| 12 | 7.7 | 3 | 0.3 | >4 months | >4 weeks | C | 5.4 | do | Do. |

A=2,4,5,4'-tetrachlorodiphenylsulfone (Tedion).
B=A Chlorinated camphene"(Toxaphene).
C=O,O-dimethyl-O-p-nitrophenylthiophosphate (Methyl Parathion).
1=Pluronic F87—A 7850 molecular weight adduct of ethylene oxide and polypropylene glycol, said adduct containing about 70% ethylene oxide.
2=A diglycollic acid ester of Pluronic F87.
3=A phosphoric acid ester of Pluronic F87.

As Table I demonstrates, use of the esters in accordance with the present invention provides for marked increases in the stability of the insecticidal compositions and for compatible pesticidal formulations.

EXAMPLES 13–23

A number of carbamate insecticidal compositions were prepared employing 4-dimethylamino-m-tolyl-N-methylcarbamate as the active ingredient in the manner set forth in Example 1. The compositions, stability characterizations thereof, pesticidal formulations prepared therewith, and compatibility characterizations thereof are presented in Table II.

TABLE II

| | Carbamate insecticidal compositions containing 7.2 parts of 4-dimethylamino-m-tolyl-N-methylcarbamate | | | Pesticidal formulations | | | |
|---|---|---|---|---|---|---|---|
| | Compatibility agent | | Stability at 60° C., days | Other pesticides | Parts | Compatibility after— | |
| Example | | Parts | | | | 24 hrs. | 2 wks. |
| 1 | | | 2 | A | 2.4 | Coagulates | Coagulates. |
| 2 | 1 | 0.8 | >7 | A | 2.4 | Passes | Passes. |
| 3 | 2 | 0.8 | >7 | A | 2.4 | ____do____ | Do. |
| 4 | | | 2 | B | 7.2 | Coagulates | Coagulates. |
| 5 | 1 | 0.8 | >7 | B | 7.2 | Passes | Passes. |
| 6 | 3 | 0.8 | >7 | B | 7.2 | ____do____ | Do. |
| 7 | 4 | 0.8 | >7 | B | 7.2 | ____do____ | Do. |
| 8 | 5 | 0.8 | >7 | B | 7.2 | ____do____ | Do. |
| 9 | | | 2 | C | 5.4 | Coagulates | Coagulates. |
| 10 | 1 | 0.8 | >7 | C | 5.4 | Passes | Passes. |
| 11 | 4 | 0.8 | >7 | C | 5.4 | ____do____ | Do. |

A = 2,4,5,4'-tetrachlorodiphenylsulfone (Tedion).
B = A chlorinated camphene (Toxaphene).
C = O,O-dimethyl-O-p-nitrophenylthiophosphate (Methyl Parathion).
1 = Phosphate ester of Pluronic P85, a 4,600 molecular weight adduct of ethylene oxide and polypropylene glycol, said adduct containing about 50% ethylene oxide.
2 = Diglycollic acid ester of Pluronic F98, a 13,500 molecular weight adduct of ethylene oxide and polypropylene glycol, said adduct containing about 80% ethylene oxide.
3 = Adipic acid ester of Pluronic L44, a 2,200 molecular weight adduct of ethylene oxide and polypropylene glycol, said adduct containing about 40% ethylene oxide.
4 = Phosphoric acid ester of Pluronic L64, a 2,900 molecular weight adduct of ethylene oxide and polypropylene glycol, said adduct containing about 40% ethylene oxide.
5 = Phosphoric acid ester of Pluronic L81, a 2,750 molecular weight adduct of ethylene oxide and polypropylene glycol, said adduct containing about 10% ethylene oxide.

As Table II demonstrates, use of the esters in accordance with the present invention provides for marked increases in the stability of the insecticidal compositions and for compatible pesticidal formulations.

EXAMPLE 24

An insecticidal composition was prepared from twenty parts of 1-naphthyl-N-methylcarbamate and 0.8 part of an ester prepared by the reaction of phthalic acid and Pluronic F87. The composition was divided into two eight-part samples and 4.8 parts of 2,4,5,4'-tetrachlorodiphenylsulfone was added to one sample and 10.8 parts of O,O-dimethyl-O-p-nitrophenylthiophosphate to the other. Both samples passed through the screen. Storage stability tests indicated that the compositions were stable for greater than six weeks at 60° C.

What is claimed is:

1. A highly stable insecticidal composition comprising, as the active ingredient, an N-methylcarbamate insecticide selected from the group consisting of 1-naphthyl-N-methylcarbamate, o-isopropoxyphenyl - N - methylcarbamate, and 4-dimethylamino - m - tolyl - N - methylcarbamate, and from 1% to 10%, based on the weight of said carbamate, of a polybasic acid ester of a hydroxyl-terminated oxyalkylene polyol of the formula:

$$HO(C_2H_4O)_a(C_3H_6O)_b(C_2H_4O)_cH$$

wherein $b$ is an integer sufficient to provide a molecular weight of at least 1200, and $a+c$ is an integer sufficient to provide 10 to 90 weight percent of the total molecular weight of the polyol.

2. The composition of claim 1 when said carbamate is 1-naphthyl-N-methylcarbamate.

3. The composition of claim 1 when said polybasic acid ester is an ester of phosphoric acid or diglycollic acid.

4. The composition of claim 1 when said polyol is a 7850 molecular weight adduct of ethylene oxide and polypropylene glycol, said adduct containing about 70% ethylene oxide.

5. A compatible pesticidal formulation comprising, based on 100 parts (a) from 5 to 70 parts of an N-methylcarbamate insecticide selected from the group consisting of 1-naphthyl-N-methylcarbamate, o-isopropoxyphenyl-N-methylcarbamate and, 4 - dimethylamino-m-tolyl-N-methylcarbamate, (b) from 0.1 to 10 parts of a polybasic acid ester of a hydroxyl - terminated oxyalkylene polyol of the formula:

$$HO(C_2H_4O)_a(C_3H_6O)_b(C_2H_4O)_cH$$

wherein $b$ is an integer sufficient to provide a molecular weight of at least 1200, and $a+c$ is an integer sufficient to provide 10 to 90 weight percent of the total molecular weight of the polyol, (c) from 5 to 60 parts of a second active ingredient selected from the group consisting of sulfur, 1,1,1-trichloro - 2,2 - bis(p-chlorophenyl)ethane, 1,1,1-trichloro-2,2-bis(p - methoxyphenyl)ethane, paradichlorobenzene, hexachlorobenzene, zinc dimethyldithiocarbamate, 1,2,3,4,10,10 - hexachloro-6,7-epoxy-1,4,-4α,5,6,7,8,8α-octahydro - 1,4 - endo-exo - 5,8 - dimethanonaphthalene, 1,2,3,4,10,10 - hexachloro-6,7-epoxy-1,4,4α,5,6,7,8,8α - octahydro - 1,4-endo-endo-5,6-dimethanonaphthalene, 1,2,3,4,10,10-hexachloro-1,4,4α,5,8,8α - hexahydro - 1,4 - endo - exo - 5,8 - dimethanonaphthalene, 2,4-dichlorophenoxyacetic acid, 2,4,5 - trichlorophenoxyacetic acid, O,O-diethyl-O-p-nitrophenylphosphorothioate, O,O-dimethyl - S - (1,2-dicarbithoxyethyl)phosphorodithioate, O,O - dimethyl - O - p-nitrophenylphosphorothioate, a chlorinated camphene with approximate formula: $C_{10}H_{10}Cl_8$, containing about 67 to 69 weight percent chlorine, and 2,4,5,4'-tetrachlorodiphenylsulfone; and (d) from 0 to 75 parts of inerts.

6. The formulation of claim 5 wherein the insecticidal composition comprises 1-naphthyl - N - methyl carbamate and from 1% to 10%, based on the weight of said carbamate, of a phosphoric acid ester of a hydroxyl-terminated oxyalkylene polyol of the formula:

$$HO(C_2H_4O)_a(C_3H_6O)_b(C_2H_4O)_cH$$

wherein $b$ is an integer sufficient to provide a molecular weight of at least 1200, and $a+c$ is an integer sufficient to provide 10 to 90 weight percent of the total molecular weight of the polyol.

7. The formulation of claim 5 wherein the second active ingredient is 2,4,5,4′-tetrachlorodiphenylsulfone, a chlorinated camphene with approximate formula:

$$C_{10}H_{10}Cl_8$$

containing about 67 to 69 weight percent chlorine or O,O-dimethyl-O-p-nitrophenylthiophosphate.

References Cited
UNITED STATES PATENTS

| | | | |
|---|---|---|---|
| 2,974,082 | 3/1961 | Collins | 424—300 |
| 3,009,855 | 11/1961 | Lambrech | 424—300 |
| 3,258,326 | 6/1966 | Rabussier | 424—286 X |
| 3,313,684 | 4/1967 | Stefcik et al. | 424—300 |

ALBERT T. MEYERS, Primary Examiner
L. SCHENKMAN, Assistant Examiner

U.S. Cl. X.R.

424—164, 170, 218, 286